July 6, 1965 W. A. ANDERSON 3,193,606
SIMULATION OF RADAR INTERFERENCE
Filed Feb. 25, 1963 3 Sheets-Sheet 1

INVENTOR.
WARREN A. ANDERSON
BY
Lawrence S. Epstein
ATTORNEYS

United States Patent Office 3,193,606
Patented July 6, 1965

3,193,606
SIMULATION OF RADAR INTERFERENCE
Warren A. Anderson, Nutley, N.J., assignor, by mesne assignments, to the United States of America as represented by the Secretary of the Navy
Filed Feb. 25, 1963, Ser. No. 260,931
4 Claims. (Cl. 35—10.4)

This invention relates to a method and an apparatus for simulating passive radar interference. This passive radar interference is the interference encountered in a radar set which is caused by returns to the radar set due to the character of the surrounding terrain or due to ambient atmospheric conditions. The passive interference caused by surrounding terrain varies inversely as the elevation angle of the radar antenna. The passive interference caused by unfavorable ambient atmospheric conditions varies as the rotational angle of the antenna varies. Passive interference does not vary extensively with time because of ground clutter and remains fairly constant for constant, unfavorable ambient atmospheric conditions. Over long periods of time and under changing atmospheric conditions and changing temperatures and humidities, passive interference in a particular location will vary. In order to present a realistic simulation of passive interference in a radar simulator or an operational radar set, it is necessary to be able to change the amount of interference as it would normally occur during operation. This is accomplished in the instant invention by having a continuously variable control means for generating such interference in accordance with changing antenna elevation angle.

The instant invention also has provision for generating window drop interference which is known in the prior art. Window drop interference is generated during actual tactical operations by the release of metallic material from an aircraft target. The metallic material re-radiates rf energy causing a video indication on operational radar indicators. This video indication has no definite form but increases in size with time. The particular form of window drop interference shown in conjunction with the passive interference structure of the instant invention is fully described in co-pending application, Serial No. 160,377 filed December 18, 1961, entitled "Window and Passive Interference Generator" in the name of Fred H. Numrich, now United States Patent No. 3,109,046, issued October 29, 1963.

It is therefore an object of the present invention to provide a novel passive interference generator.

A further object of the instant invention is to provide a novel simulating device for simulating a combination of window drop interference and passive interference.

Another object of the instant invention is to provide a novel simulating device for generating composite radar displays.

Other objects and many of the attendant advantages of this invention will be readily appreciated as the same becomes better understood by reference to the following detailed description when considered in connection with the accompanying drawings wherein.

Figure 1:
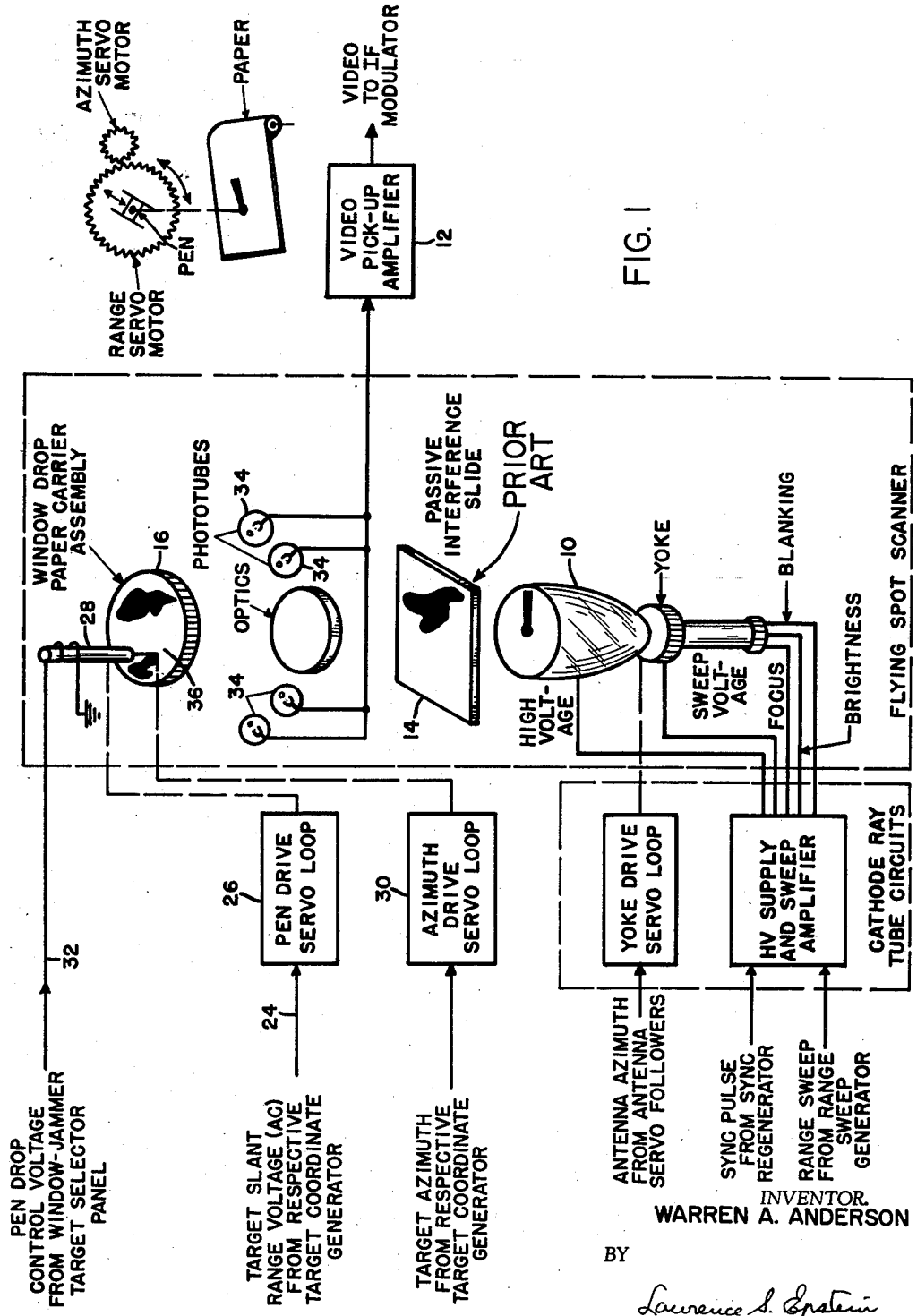
FIG. 1 is a block functional diagram of the window and passive interference generators found in the prior art.

In order to realistically simulate passive interference it is necessary to simulate such interference automatically in accordance with changing antenna elevation angle. That is, as the antenna elevation increases from the horizontal, the amount of radar echoes returned from the surrounding terrain will decrease. This effect is simulated in the instant invention by means of simple mechanical components and simple circuitry. A type of interference generator which is utilized to generate passive and window interference is shown in FIG. 1. Window drop interference is generated by a moving radar target when it is desirous to confuse a tracking or observing radar and thereby obscure its own echo. Such interference may be generated by a form of interference screen to obscure the passage of many aircraft or radar targets. This interference screen or window drop comprises pieces of lightweight metal which are highly reflective and which reflect impinging radar signals in such a pattern so as to provide very strong echoes which have a random appearance. These very strong echoes tend to obscure weaker target signals or target echoes.

Figure 2:
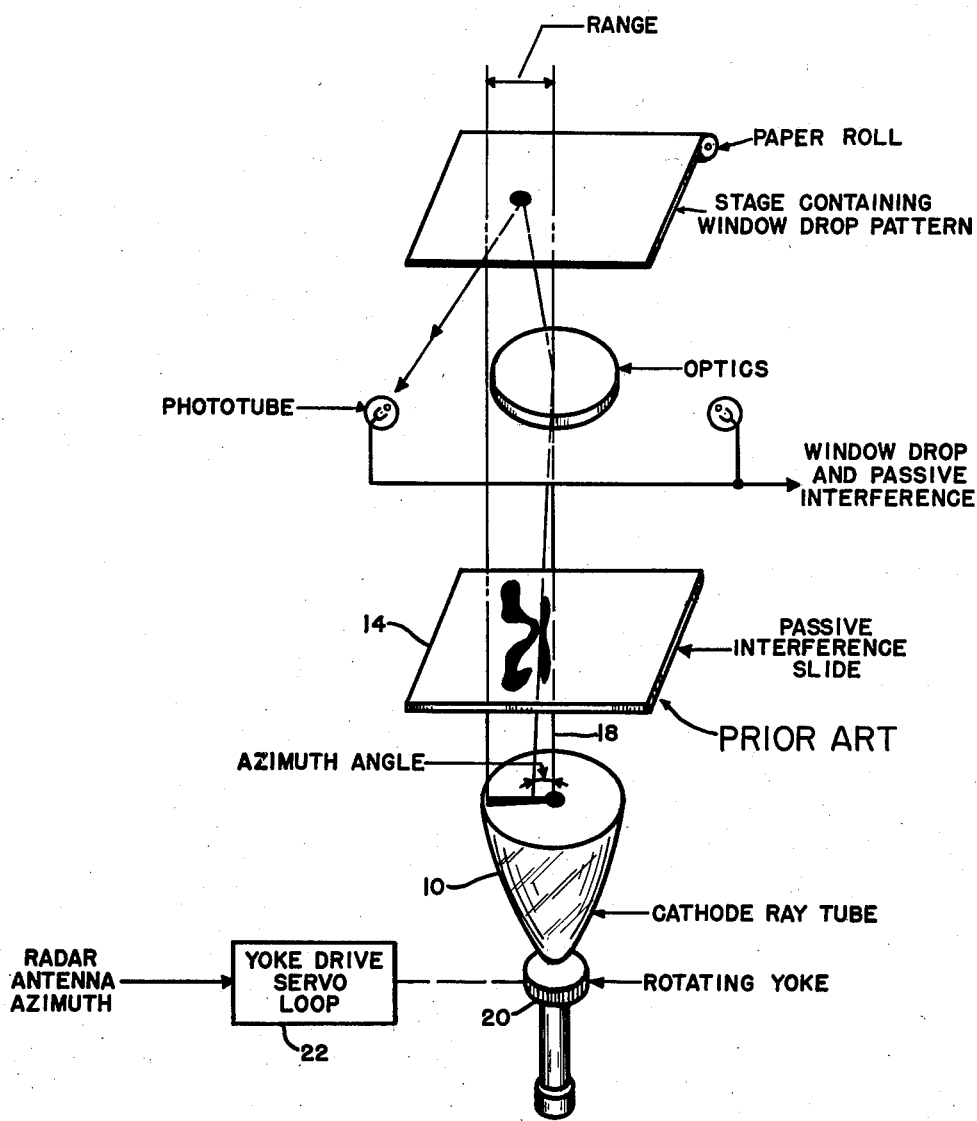
FIG. 2 is a diagram of the prior art showing a previously used method for defining range and azimuth of passive interference components.

Referring to the prior art shown in FIG. 1, the light from the cathode ray tube 10 is used as a scanner. The light from the cathode ray tube sweep is converted into video signals by a photo pickup tube 12 after modulation by a passive interference transparency 14 and a translucent stage 16 containing a window drop pattern generated by ink drop. An azimuth drive servo loop 30 rotates the pen carrier assembly 16 to an angular position that represents the instantaneous azimuth, which azimuth signal is derived from a target coordinate generator (not shown) of the simulated target. Thus, when a window drop impression is initiated, the pen will deposit ink at a rate determined by an external control 32. The pen drive servo loop 26, will drive the pen to a range position determined by an external signal 24 and window drop interference video will be developed on the window drop paper assembly 16 which has a highly absorbent paper 36, positionel thereon. An ink drop pen 28 is driven in an angular direction by azimuth driver servo loop 30. Due to the fact that the axis of the passive interference is centered with respect to that of the PPI, each passive interference component of a given range is converted into a video signal at a time required for the PPI sweep to travel from the center of the screen to an equivalent point on the transparency. This action can be visualized with the aid of FIG. 2. Referring to that figure, the axis 18 passes through the passive interference slide 14 and the center of the cathode ray tube scanner 10. If the sweep of the PPI which is controlled by rotating yoke 20 and yoke servo loop 22, is made to rotate in synchronism with the operational antenna of the simulator, this operational antenna not being shown, but being present in the operational equipment or simulation equipment, interference video is generated when respective passive interference components are at the same azimuth as the operational radar antenna. This action will then servo to provide passive interference in a similar manner as a target antenna pattern generator.

This prior art passive interference had the defect of only showing passive interference at certain rotational antenna angles and then only to simulate particular points of interference without taking into effect overall ground clutter and possible atmospheric conditions and changing atmospheric conditions. The instant invention provides a simplified structure and method for generating passive interference in the structure and circuitry shown in FIGS. 1 and 2 and overcoming the deficiencies of the prior art.

Figure 3:
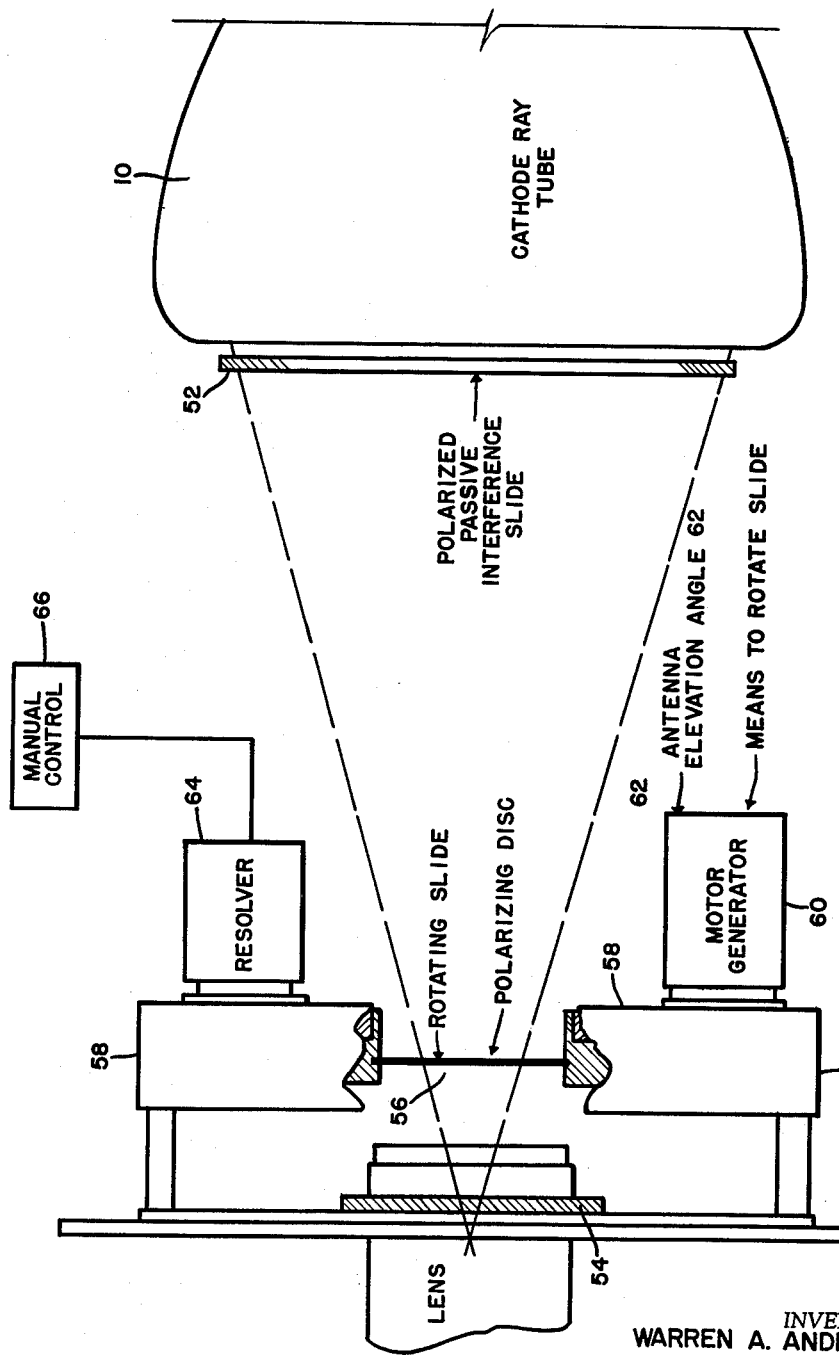
FIG. 3 is a block schematic diagram showing the passive interference simulation structure and method of the instant invention.

The present invention which is shown in FIG. 3 utilizes a polarized passive interference slide 52 which is placed over the face of the cathode ray tube 10. At a distance from the face of the cathode ray tube 10 determined by the design of the optics 54, a rotating polarizing disc 56 is mounted. The action of the rotation of the polarizing disc 56 in relation to the polarized passive interference slide 52 is such that as the polarizing disc rotates, the amount of scan reaching the photo tubes 34 changes from a maximum point to a minimum point or approximately 0 as the disc is rotated. Thus the angle formed between the respective directions or axis of polarization of the two elements which are polarized, the passive interference slide 52, and the rotating polarizing disc 56 is varied. This angle is referred to in the specification as the "polarization angle," the angle formed between their respective directions or axis of polarization. The polarized passive interference slide 52 can be blank, that is have no shading, in order to simulate a general overall ground clutter, or it can have definite shadings upon it which can be made to get more or less opaque depending upon the rotational angle of the polarizing disc. The polarizing disc 56 is mounted by means of gearing 58 which is controlled by rotational means 60 which are in turn controlled by signals representative of the antenna elevation angle 62.

In addition to this automatic control of the passive interference in accordance with the elevation angle of the antenna, there is also means for manually controlling the amount of passive interference by means of the resolver 64 which controls the gearing 58 to drive the polarizing disc 56, said resolver 64 being in turn controlled by manual control 66. Thus, the passive interference slide 14 of FIG. 2 and FIG. 1 (the prior art) is replaced by a polarized passive interference slide 52, and a controlled polarizing disc 56 with associated drive means inserted between the optics lens 54 and this polarized passive interference slide 52. With this novel structure, passive interference is realistically simulated under different ground clutter conditions and various unfavorable ambient atmospheric conditions. The polarized passive interference slide 52 can be specially prepared to simulate different general types of ground clutter that may be encountered, or it can be made to simulate a particular type of ground clutter situation.

Both passive interference generated by passive interference structure, and window drop interference may be generated simultaneously. A conversion of the passive interference simulation and window drop interference simulation to video signals is accomplished by the multiplier tubes 34. A three-stage video amplifier 12 is used to raise the level of the passive and window interference video signals before addition to target video.

Obviously many modifications and variations of the present invention are possible in the light of the above teachings. It is therefore to be understood that within the scope of the appended claims the invention may be practiced otherwise than as specifically described.

What is claimed is:
1. A simulating device in a passive interference generator comprising,
   means for simulating window drop and passive interterference, a cathode ray tube scanning means providing a plan position indicator scan,
   polarized first screen means optically lined with said cathode ray tube scanning means, said screen means having passive interference opaque areas drawn thereon,
   control polarized means, optically aligned with said first polarized screen means and said scanning means for varying the polarization angle between said two polarized means,
   second rotatable screen means, optically aligned with said polarized first screen means, said scanning means, and said control polarized means,
   window drop generating means optically aligned too said second screen means for generation of window drop interference,
   photo tube pick-up means optically operative with said first and said second screen means and said scanning means, and said first screen means, said second screen means and said control polarized means located between said photo tube pick-up means and said scanning means, whereby said scanning means in conjunction with said first and said second screen means and said window drop generating means provides said phototube means with visual simulation of passive and window drop interference,
   video amplifier means operatively connected to the output of said phototube means for generation of video signals in accordance with the appearance of said passive and window drop interference, and
   azimuth drive servo loop operatively connected to said second screen assembly for rotating said screen assembly in accordance with target azimuth and information signals which are supplied from an external target coordinate generator.
2. The combination of claim 1 and
   signal input means simulative of antenna elevation angle,
   drive means, said drive means being actuated by simulated antenna elevation angle signals and operatively connected to said control polarized means whereby said passive interference varies inversely as the antenna elevation angle.
3. The combination of claim 2 wherein said drive means comprise, motor means,
   gearing means,
   said motor means being operatively connected to said gearing means,
   said gearing arrangement being operatively connected to said control polarized means,
   said control polarized means comprising,
   a polarizing disc,
   said motor means driving said gearing means to rotate said polarizing disc and change the polarization angle in accordance with said antenna elevation angle.
4. The combination of claim 3, and
   manual control means, said manual control means operatively connected to said polarizing control means whereby said manual control means control the operation of said passive interference polarizing disc.

References Cited by the Examiner
FOREIGN PATENTS
908,031 10/62 Great Britain.

CHESTER L. JUSTUS, Primary Examiner.
MAYNARD R. WILBUR, Examiner.